Inventor,
Lionel Charles Heal
By, Stevens and Davis
Attys

April 1, 1947.  L. C. HEAL  2,418,301
AIRCRAFT SUPPORTING SURFACE
Filed Nov. 27, 1943  2 Sheets-Sheet 2
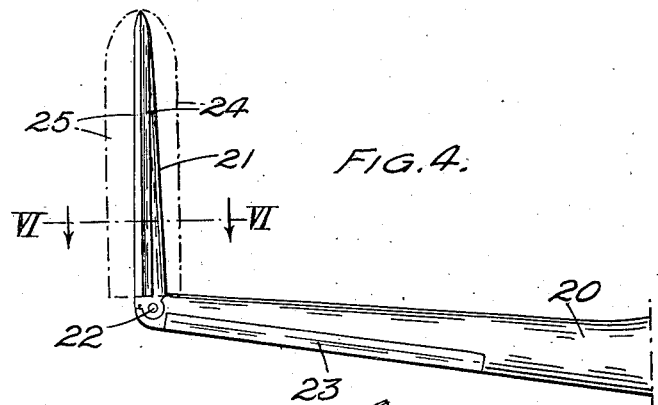
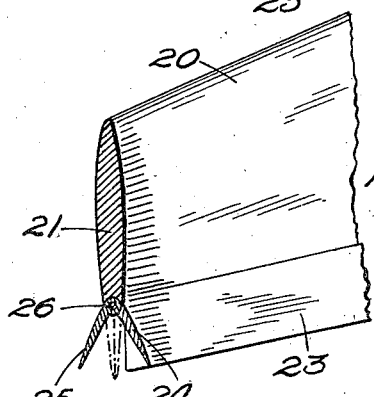
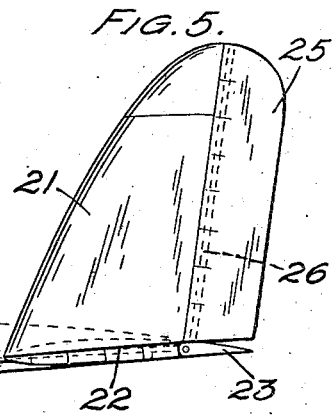
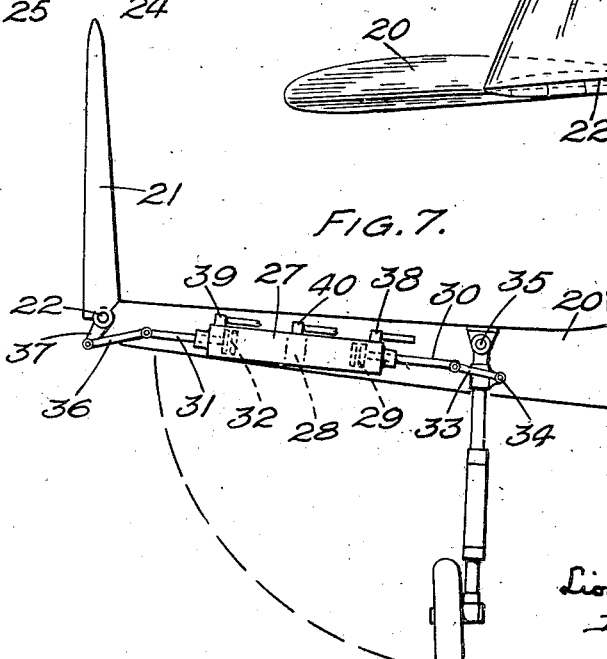
Inventor,
Lionel Charles Heal
By, Stevens and Davis
Attys Patented Apr. 1, 1947

2,418,301

UNITED STATES PATENT OFFICE 2,418,301

AIRCRAFT SUPPORTING SURFACE

Lionel Charles Heal, Reading, England, assignor to Miles Aircraft Limited, a company of Great Britain Application November 27, 1943, Serial No. 511,996
In Great Britain July 24, 1942

4 Claims. (Cl. 244—75)

The present invention consists in an aircraft supporting surface which may be a main wing or a tailplane whereof a tip portion is pivotally connected and controllable so that it can be projected into a substantially vertical plane in relation to the normal attitude of the aircraft, said tip portion including an adjustable control surface operable for control of manoeuvre with the tip portion projected into the substantially vertical plane.

Though the invention is considered to be particularly applicable to tailless types of aircraft in which, of course, the wings have considerable sweep back, it is conceivable that it may also have useful application to the more normal types of aircraft including the main wing and tailplane structures, in which event the tips of either or both the main wing and tailplane may be adjustable in the sense intended.

The invention contemplates differential adjustment of the pivoted tips and/or of the control surfaces which they mount.

In a preferred construction as applied to a tailless monoplane aircraft, the wings, as is usual in such craft, have considerable sweep back and the extreme tip of each wing is pivoted about an axis extending substantially parallel with the longitudinal axis of the aircraft. For take-off purposes, each wing tip is locked in a position in which it is in line with and forms a continuation of the fixed wing part and the tips can remain in that setting for climb and ordinary cruising because, providing a contra-rotating airscrew is employed or providing the aircraft is of a multi-engine type with oppositely rotating airscrews, rudder control becomes almost redundant for all ordinary purposes while actually in flight.

In preferred constructions, the trailing edge of the pivoted wing tip is fitted with control surfaces, preferably in the form of split flaps operable independently of each other and preferably, also, in a differential sense for employment in the manner of a split flap or as an aileron control or air brake, the fixed inner part of the wing being provided with the usual elevators and trailing edge flaps.

The pivoted wing tips are adjustable under control of the pilot, so that they can be swung up through approximately 90° by jack means or some other suitable remotely controllable mechanism and locked in the adjusted position, the arrangement being such that the adjustable control surfaces which the pivoted wing tips mount remain controllable by the pilot in the setting in which the wing tips are locked substantially vertical in relation to the wing. Thus, with the wing tips set substantially vertically relative to the wings, the split trailing edge of each wing tip can be operated independently of the other wing tip control to operate on one side of the aircraft only as a rudder, whereas, conversely, when both split trailing edge flaps of the pivoted wing tips are operated together an appreciable air-brake effect is provided. It is worthy of note that when one split flap is operated under such conditions, a downward component is introduced due to the rake back of the hinge line, which arrangement gives the equivalent effect of aileron control. Likewise, when the split flaps of both wing tips are operated together, the downward component is produced on both sides of the plane centre line and results in a very much increased gliding angle.

In operation of an aircraft of the tailless type, as above set forth, the aircraft is rudderless for take-off purposes but has elevators and flaps on the fixed part of the wing, as well as the adjustable surfaces on the adjustable wing tips, which control surfaces may be used as ailerons. When altitude has been achieved or should violent manoeuvre become necessary, the tips are turned upwardly (or downwardly) through an angle of approximately 90°, thus achieving a considerable reduction in wing area and providing the aircraft with substantial fin and rudder surface aft of its centre of gravity, which rudder surface can be used for rapid change of direction and for control purposes generally, as hereinbefore described.

In some cases, provision may be made for projection of the wing tip portions into the substantially vertical plane concurrently with extension of a retractable undercarriage in order to provide for a high degree of lateral control and stability for landing.

The usual provision may be made for aerodynamic balance of the control surfaces of the adjustable tips in order to keep the operating loads low.

In order that it may be clearly understood and readily carried into effect, the invention is hereinafter described with reference to the accompanying diagrammatic drawings, of which:

Figure 4 is a rear end elevation corresponding to Figure 3;

Figure 5 is a side elevation corresponding to Figures 3 and 4;

Figure 6 is a fragmentary cross-section taken on the line VI—VI of Figure 4, but with control surface on the wing tip portion in the form of a split trailing edge flap opened out into an operative condition, the general outline of the control surfaces as viewed in rear end elevation in Figure 4 being indicated in Figure 4 in dotted lines.

Figure 7 is a general view illustrating one manner of projecting the wing tip portion into the vertical plane and, in this case, arrangement is made for operating the wing tip portion for projection as the undercarriage is extended ready for landing.

In the drawings, the same reference numerals have been employed to indicate similar parts.

Figure 1:
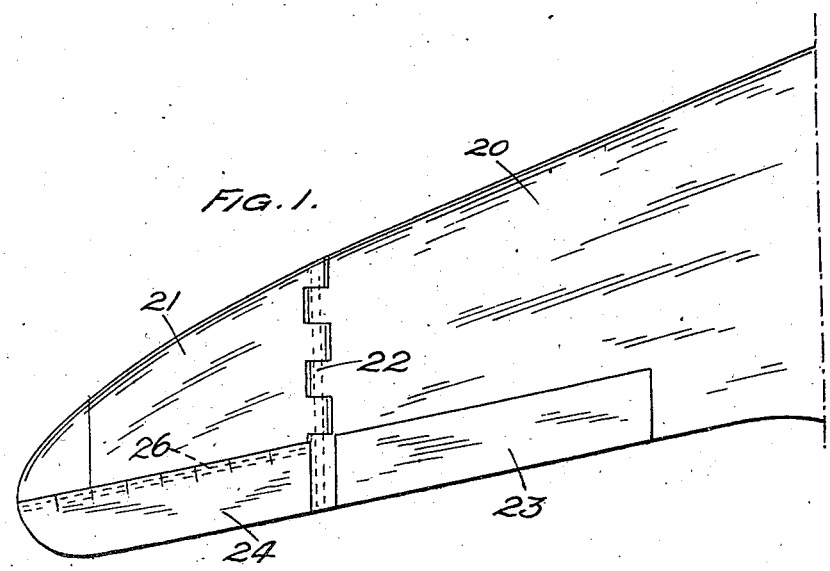
Figure 1 is a plan view of a supporting surface according to the present invention showing the tip portion in the extended condition in which it is normal with respect to the spanwise axis of the surface.
Figure 2:
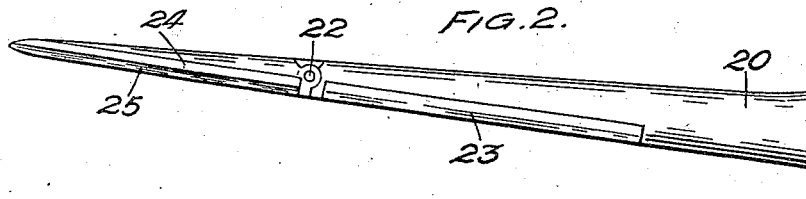
Figure 2 is a rear end elevation corresponding to Figure 1.

Referring now to Figures 1 and 2 of the drawings, the main part of the supporting surface is represented by the reference numeral 20, the wing tip portion being represented by the reference numeral 21, connected for pivotal movement about an axis defined by the shaft 22. The main part of the surface 20 is provided at its trailing edge with an adjustable control surface 23, which may be of any convenient or known form. At the trailing edge of the wing tip poriton 21 an adjustable control surface is provided, which preferably takes the form of a split trailing edge flap constituted by the two adjustable surfaces 24, 25.

Figure 3:
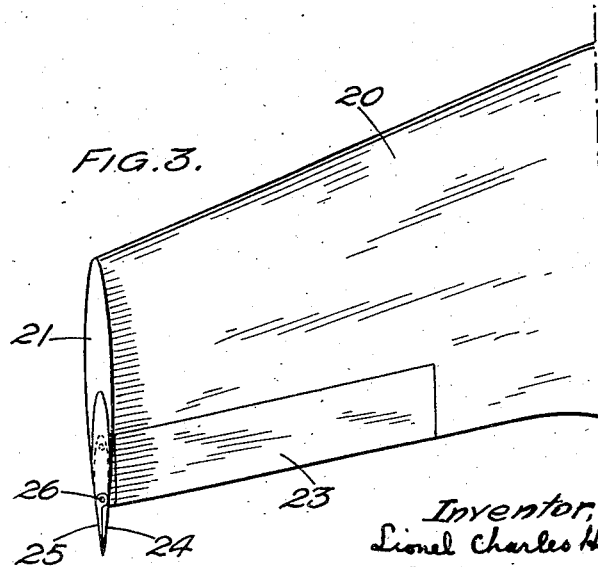
Figure 3 is a plan view corresponding to Figure 1, but showing the wing tip projected into the substantially vertical plane.

If we now consider Figures 3, 4 and 5, it is immediately apparent that in these figures the wing tip portion 21 has been projected up into an angular setting in which it is disposed vertically in relation to the normal attitude of the aircraft. As shown in Figures 3, 4 and 5, the angular setting of the wing tip portion 21 is truly vertical; in other words, it would be parallel with any normal single fixed tail fin surface embodied in the tail unit of an aircraft, but it is to be appreciated that some departure from the true vertical setting may be provided for, either in the alternative sense or in the sense for providing for some variation of the ultimate setting into which the wing tip portion could be projected directly under control of the pilot. For instance, the final intended setting might conceivably be vertical to the spanwise axis of the wing, in which event the upper edge of the wing tip, as seen in Figures 3, 4 and 5, would be raked somewhat inwardly, an angle corresponding to the dihedral angle of the wing.

As seen in Figure 6, the control surfaces 24 and 25 have been adjusted under control of the pilot in the manner of a split trailing edge flap, in which setting they provide a wing tip air brake effect producing not only a turning moment about the wing tip axis due to the aerodynamic drag induced, but also a downward component due to the rake back of the shaft 26 about which the surfaces 24 and 25 pivot in operation. In tailless types of aircraft it will be appreciated that the rake back of a wing might be appreciably greater than that of the wing form shown in Figures 1 and 3.

In regard to the operation of the control surfaces 23, 24 and 25, it can be said that any suitable mode of control can be provided for and illustration of a specific form of control is therefore unnecessary. Generally speaking, however, it is preferred that the surface 23, which may itself be of the split trailing edge flap type, shall be operable independently of the control surfaces 24, 25 at the wing tip. In regard specifically to the operation of the control surfaces 24 and 25 at the wing tip, their angular adjustment in relation to the wing tip portion 21, either in the projected or normal setting, can be achieved by any of the common cable, hydraulic or shaft drives. In the case of a cable connection between the surfaces 24, 25 and the pilot operated control member, it is obvious that if the control cable is caused to pass through the axis of the shaft 22 in the course of its run control of the surfaces will remain unaffected by the angular relationship of the wing tip portion 21 with respect to the main wing portion 20. Likewise, with a hydraulic system operating jacks extending between the wing tip portion 21 and the individual surfaces 24, 25, provision may be made for swivelling a throughflow hydraulic coupling about an axis coincident with that of the shaft 22. As a further alternative, the shaft 26 (see particularly Figures 3 and 6) can incorporate a universal joint co-axial with respect to the shaft 22 for direct shaft control transmitting actuating loads in torque from the pilot actuated control member.

In Figure 7 there is shown one manner of projecting the wing tip upwardly into the substantially vertical setting. In this case, hydraulic means are provided and the wing tip can be projected upwardly at the same time as the undercarriage is put down for landing. Obviously, instead of employing hydraulic means for projecting the wing tip into the vertical setting, any other mechanical means could be provided to operate with or independently of undercarriage extension. Likewise, instead of projecting the wing tip upwardly, it might in some circumstances be projected downwardly. In any event, where actuation of the wing tips is provided for in conjunction with undercarriage extension, the arrangement will always preferably be such that wing tip control is provided independently of undercarriage operation.

In the particular arrangement shown in Figure 7, the hydraulic jack cylinder 27 is partitioned into two axially spaced compartments by the central partition 28. In one compartment the piston 29 of the plunger 30 operates, whereas the plunger 31 has at its inner end the piston 32 operating in the other compartment. The plunger 30 has a connecting link 33 pivotally connected to the undercarriage leg at 34 so that axial movement of the plunger 30 results in swinging the undercarriage leg up or down about the retraction pivot 35 according to the sense of axial movement. The wing tip actuating link 36 is pivoted to the outer end of the plunger 31 and to the wing tip actuating lever 37. Three operating connections are provided to the jack cylinder 27, one at each end as indicated, respectively, by the reference numerals 38 and 39, and one centrally as indicated by the reference numeral 40, in communication with both compartments of the jack through the partition 28. The actuating connections 38, 39 and 40 are operable from a conveniently available source of actuating pressure under control of a selector valve readily accessible to the pilot. If the pilot so actuates the selector valve as to ensure that actuating fluid is delivered to the jack cylinder 27 through the connection 39, the jack plunger 31 is retracted thereby causing the wing tip portion 21 to be set downwardly from the position in which it is shown in Figure 7. Conversely, to project the wing tip 21 into the vertical setting, as shown in Figure 7, pressure is necessarily applied and maintained by the pilot setting the selector valve to direct the actuating fluid pressure through the flow connection 40. The valving is such that when pressure is applied to the jack through the connection 39, return flow is permitted from the jack through the body of the selector valve to the hydraulic liquid supply reservoir, from which the pump or equivalent pressure member of the actuating circuit is normally fed. Likewise, when pressure is applied through the connection 40, drain of jack back to the reservoir is provided through the connection 39.

If pressure is applied to the piston 29 of the undercarriage actuating jack plunger 30 through the connection 40 with the connection 38 connected back to the reservoir, the undercarriage leg is extended into a position something like that shown in Figure 7. Application of pressure to the jack cylinder 27 through the connection 38 will result in undercarriage retraction. A single selector valve may be provided for actuation by the pilot to control the angular setting of the wing tip 21 and undercarriage retraction and extension entirely automatically of each other or together at the pilot's choice, or the jack connections 39 and 40 may be controlled by one valve for wing tip operation and another selector valve can, in such cases, control the connections 38 and 40. Where hydraulic operation is provided for manipulation of the valve for effective closure on completion of the requisite movement of the jack plungers 30 and/or 31 can be utilised to provide a positive hydraulic lock, but in all cases independent locking means may be provided for.

What I claim is:

1. An aircraft supporting surface whereof a wing tip portion is pivotally connected and controllable so that it can be projected into a substantially vertical plane in relation to the normal attitude of the aircraft, said tip portion including an adjustable control surface operable for control of manoeuvre with the tip portion projected into the substantially vertical plane.

2. An aircraft supporting surface as set forth in claim 1, wherein the adjustable control surface is subdivided into a plurality of control surfaces operable as a split trailing edge flap.

3. An aircraft supporting surface whereof a wing tip portion is pivotally connected for projection into a substantially vertical plane in relation to the normal attitude of the aircraft, an undercarriage member mounted for extension to and retraction from aircraft supporting position, single power means for simultaneously projecting said wing tip portion and extending said undercarriage member to aircraft supporting position, an adjustable control surface on the trailing edge of said wing tip portion, and means for operating said control surface with the wing tip portion projected into said substantially vertical plane.

4. An aircraft supporting surface whereof a wing tip portion is pivotally connected for projection into a substantially vertical plane in relation to the normal attitude of the aircraft, an undercarriage member mounted for extension to and retraction from aircraft supporting position, and a hydraulic jack for simultaneously projecting said wing tip portion and extending said undercarriage member to aircraft supporting position.

LIONEL CHARLES HEAL.

REFERENCES CITED

The following references are of record in the file of this patent:

UNITED STATES PATENTS

| Number | Name | Date |
| --- | --- | --- |
| 1,378,387 | Stokes | May 17, 1921 |
| 1,947,461 | De Port | Feb. 20, 1934 |
| 2,173,538 | McKellar | Sept. 19, 1939 |
| 2,279,615 | Bugatti | Apr. 14, 1942 |
| 1,496,200 | Baumann et al. | June 3, 1924 |

FOREIGN PATENTS

| Number | Country | Date |
| --- | --- | --- |
| 561,129 | French | July 28, 1923 |
| 347,173 | Italian | Mar. 20, 1937 |